(12) United States Patent
Johnson et al.

(10) Patent No.: US 6,865,344 B1
(45) Date of Patent: Mar. 8, 2005

(54) CODE-SWITCHED OPTICAL NETWORKS

(75) Inventors: Alan E. Johnson, Milpitas, CA (US); Michael J. Munroe, Petaluma, CA (US); Anders Grunnet-Jepsen, Milpitas, CA (US); Eric S. Maniloff, Ontario (CA); John N. Sweetser, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 569 days.

(21) Appl. No.: 09/712,822

(22) Filed: Nov. 13, 2000

Related U.S. Application Data

(60) Provisional application No. 60/165,310, filed on Nov. 12, 1999.

(51) Int. Cl.[7] .............................. H04J 4/00; H04J 14/00
(52) U.S. Cl. .......................... 398/77; 398/78; 398/183; 398/87; 341/137
(58) Field of Search ........................ 398/77, 78, 69–70, 398/71, 87, 45, 48, 52, 183, 186; 370/320, 335, 342; 341/137

(56) References Cited

U.S. PATENT DOCUMENTS

| | | | | |
|---|---|---|---|---|
| 4,703,474 A | * | 10/1987 | Foschini et al. | 370/441 |
| 4,866,699 A | * | 9/1989 | Brackett et al. | 398/78 |
| 6,081,531 A | * | 6/2000 | Haber | 370/400 |
| 6,236,483 B1 | * | 5/2001 | Dutt et al. | 398/141 |
| 6,313,771 B1 | * | 11/2001 | Munroe et al. | 341/137 |
| 6,507,573 B1 | * | 1/2003 | Brandt et al. | 370/335 |
| 6,614,956 B2 | * | 9/2003 | Leng et al. | 385/24 |
| 2002/0163696 A1 | * | 11/2002 | Huang et al. | 359/154 |

FOREIGN PATENT DOCUMENTS

DE 19629530 C1 * 10/1997 .......... H04J/14/02

* cited by examiner

*Primary Examiner*—Kinfe-Michael Negash
(74) *Attorney, Agent, or Firm*—Blakely, Sokoloff, Taylor & Zafman LLP

(57) ABSTRACT

Communication systems and methods are disclosed that route, detect, and decode encoded optical signals at network nodes based on channel codes assigned to the network nodes. In an example communication system, a network hub includes a channel selector that encodes an optical signal with a channel code assigned to one or more network nodes. The channel selector is configured to encode based on a channel selection signal provided to the channel selector and can include one or more fiber Bragg coders. Code-switched communication systems can include one or more nodes configured in ring, tree, or bus architectures.

24 Claims, 3 Drawing Sheets

(a)

(b)

CODE-SWITCHED OPTICAL NETWORKS

This application claims benefit of 60/165,310 filed on Nov. 12, 1999.

TECHNICAL FIELD

The invention pertains to optical communication systems and methods.

BACKGROUND

Communication systems that include master node/remote node communication include the Synchronous Optical Network (SONET) and Asynchronous Transfer Mode (ATM) networks in which optical data signals are converted into electronic signals at each node of the network. The electronic signals are then decoded in order to make routing decisions before data is retransmitted optically down a selected path. Such optical-to-electronic-to-optical conversion at each network node requires expensive active equipment that generally must operate at the full network bandwidth.

One all-optical routing method that reduces the number of optical-electronic conversions is wavelength division multiplexing (WDM) in which different nodes of a network receive different optical signals having different center wavelengths. A communication hub sends data to a selected destination by selecting a suitable wavelength, either by switching between several lasers that emit at different center wavelengths, or by selectively tuning a single, tunable laser source. Unfortunately, telecommunication-grade tunable lasers are not readily available, and providing multiple lasers is expensive.

For these reasons, improved optical communication systems, networks, and methods are needed.

SUMMARY OF THE INVENTION

Communication methods are provided that include encoding a channel code on at least one optical signal and decoding the encoded optical signal or signals at a destination corresponding to the channel code. In representative embodiments, channels codes are assigned to a plurality of optical signals and the optical signals are decoded at corresponding destinations. In further embodiments, two or more of the channel codes are different.

Optical communication methods include assigning a channel code to at least one network node and decoding an optical signal encoded with the assigned channel code at the network node. In representative embodiments, the optical signal includes one or more component optical signals encoded with two or more channel codes, and in some examples, at least one of the two channel codes is the assigned channel code. In still further embodiments, the methods include configuring a network node to transmit at least a portion of the encoded optical signal received at the network node. Fiber Bragg gratings can be provided for encoding and/or decoding.

Communication systems are provided that include at least two communication nodes configured to decode an encoded optical signal. The communication systems can include a transmission medium configured to provide a communication path between the two communication nodes. In representative embodiments, the communication systems include a communication hub situated and configured to encode an optical signal to produce the encoded optical signal and the communication hub is configured to select a channel code corresponding to at least one of the communication nodes.

Optical networks are provided that include a hub configured to receive an input data signal and produce a modulated optical signal based on the input data signal and one or more network nodes situated and configured to receive respective optical signals associated with respective channel codes assigned to the respective optical signal by the hub. The hub includes a channel selector that selects and applies a channel code to an optical signal and the channel selector includes an optical switch. In representative embodiments, the channel selector includes at least one encoder situated and configured to apply at least one channel code to the optical signal the encoder is a fiber Bragg grating. In further embodiments, the network node includes a decoder matched to the code associated by the hub with the network node and the decoder includes a fiber Bragg grating. In other embodiments, the hub and the network nodes are configured to communicate over a bus, or are arranged in a ring or tree configuration.

Network nodes are provided that include a decoder configured to decode an optical signal based on a channel code and configured to transmit at least a portion of the optical signal. In some examples, the decoder includes a fiber Bragg grating.

These and other features of the invention are described further with reference to the accompanying drawings.

DETAILED DESCRIPTION

Communication systems, networks, and methods are disclosed that do not require active switching elements outside of a master node, but rather use optical coding to route or switch optical data streams to one or more of several destinations. Optical codes are applied to the optical data streams to determine the destination of the data, i.e., destinations are selected based on optical codes. Such systems are referred to herein as "code-switched." A representative communication system includes a master node that transmits an optical signal to a remote node selected from a set of remote nodes. The master node directs the optical signal to the selected remote node by encoding the signal with a remote-node-specific optical code ("channel code"). Channel codes can be amplitude codes, frequency codes, or phase codes, or combinations thereof. Channel codes can be binary codes or can have three or more associated code values. For example, a channel code can be defined as a series of code elements corresponding to phase shifts of 0 degrees, +120 degrees, and −120 degrees. An optical signal typically is encoded by directing the optical signal to a coder that modifies the input optical data stream as specified by a code associated with a transfer function. The encoded optical signal then propagates to the remote nodes through an optical fiber or other transmission medium, including free space.

The coding and decoding of the optical signal is accomplished by coding devices ("coders" or "encoders") implemented as fiber Bragg gratings, arrayed waveguide gratings, concatenated Mach Zehnder interferometers, complex thin film filters, and surface gratings or other optical coders. These coders receive an optical data stream and apply a transfer function corresponding to a selected code to the received optical data stream. In such a code-switched system, in contrast to WDM systems, different channels can occupy the same optical bandwidth. The channels are not necessarily differentiated by center wavelengths or frequencies, but by, for example, temporal codes (amplitude and/or phase) applied by a coder. Encoding (coding or decoding) of an optical signal based on a channel code can be performed directly on the optical signal and does not require transduction of the optical signal to an electrical signal.

Figure 1:
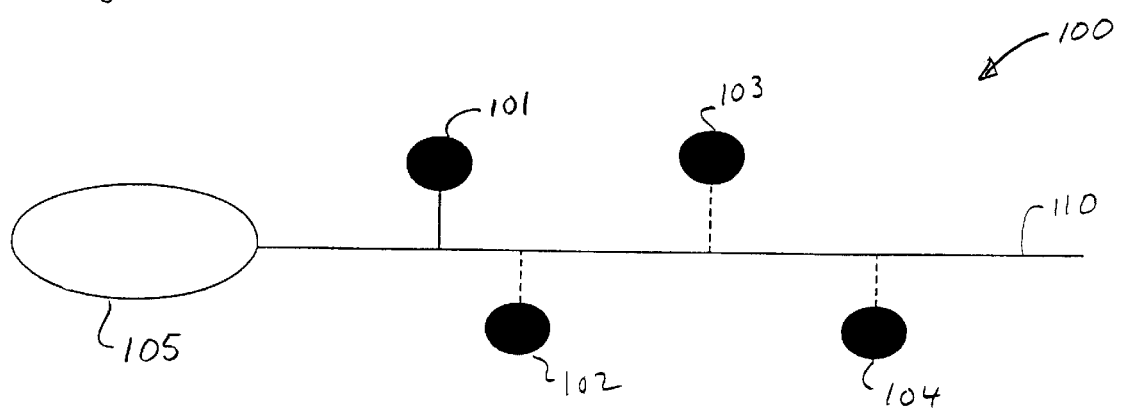
FIG. 1 is a schematic block diagram of a communication system that includes a master node and a plurality of remote nodes.

With reference to FIG. 1, a communication system 100 comprises a master node 105 that transmits an optical signal or signals to one or more selected members of a set of remote nodes 101–104. The maser node 105 communicates with the remote nodes 101–104 via a transmission medium 110, typically an optical fiber. As shown in FIG. 1, the communication system 100 is illustrated for the particular example of four remote nodes, and communication is between the master node 105 and the remote node 101 as indicated by the solid line connecting the remote node 101 to the transmission medium 110. The nodes 102–104 (and/or the node 101) can be switched selectively to receive optical signals from the transmission medium 110.

As used herein, an "optical data signal" refers to propagating modulated or modulatable electromagnetic radiation in a wavelength range from about 200 nm to about 0.100 mm. The modulation of the radiation can be amplitude modulation, phase modulation, frequency modulation, polarization modulation, or a combination thereof, or any other modulation that is impressed on the radiation according to analog or digital data to be transmitted and/or received. For convenience, an encoded optical signal is referred to as "received" by a selected communication system node if data carried by the modulated optical signal can be recovered at the node.

As shown in FIG. 1, the communication system 100 is configured in a bus topology wherein the transmission medium 110 is configured as a bus to which all the remote nodes 101–104 can be connected. Coded optical signals provided by the master node 105 can be coded with channel-selection codes corresponding to respective remote nodes 101–104, or the remote nodes 101–104 can be configured to receive optical signals encoded with one or several channel codes. In addition, the master node 105 can be configured to encode a single optical data stream with several channel codes so that data can be recovered by several remote nodes. For communication with several selected network nodes, each of the selected network nodes receives a portion of the optical data signal from the master node 105 via the transmission medium 110. With the bus architecture of FIG. 1, an optical data signal encoded with a channel code for the remote node 101 also can be supplied to the remaining nodes but data generally is not recovered from such an encoded optical data signal at the remaining remote nodes unless the remaining nodes are provided with a decoder that corresponds to or is matched to the channel code for the remote node 101.

Figure 2:
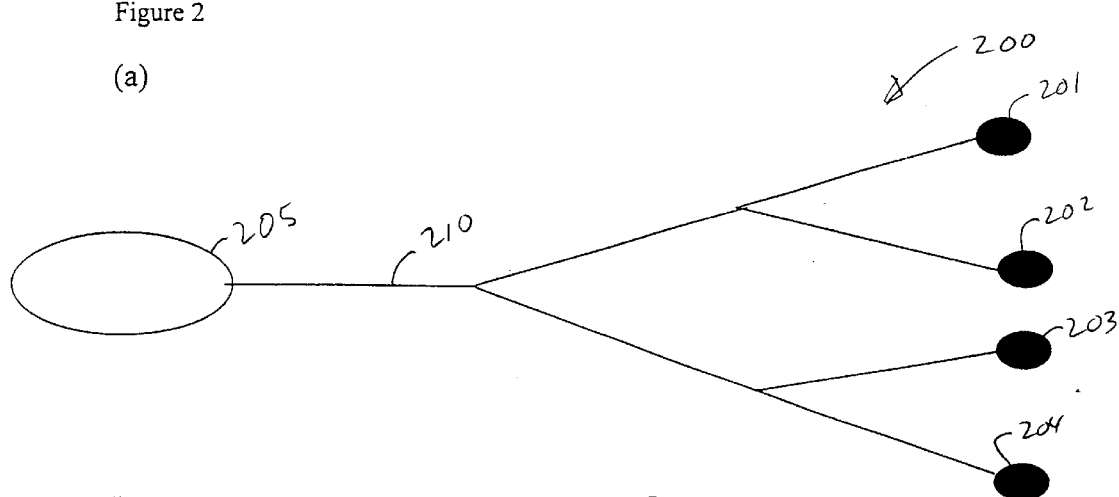
FIG. 2A is a schematic block diagram of a communication system configured in a tree topology.
FIG. 2B is a schematic block diagram of a communication system configured in a ring topology.
Figure 2:
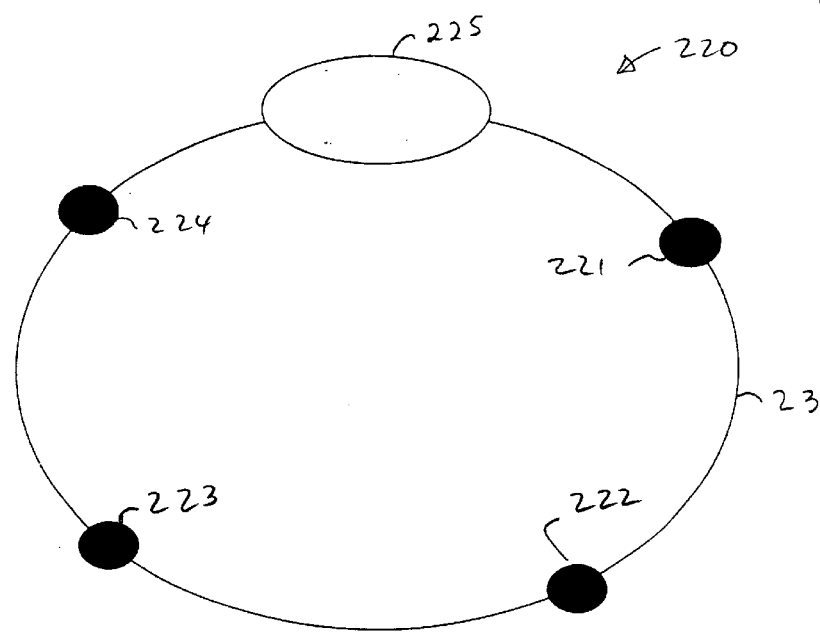

Alternative embodiments of code-switched optical communication systems are illustrated in FIGS. 2(a)–2(b). With reference to FIG. 2(a), a communication system 200 includes a master node 205 and remote nodes 201–204 distributed in a tree architecture using a transmission network 210. With reference to FIG. 2(b), a communication system 220 includes a master node 225 and remote nodes 221–224 configured in a ring architecture on a transmission medium 230. The representative embodiments of FIGS. 2(a)–2(b) are exemplary and not intended to be limiting in any way. Communication systems can be configured in other architectures that include a master node and one or more remote nodes.

Referring further to FIG. 1, a coded optical data stream sent by the master node 105 is transmitted to one or more of the remote nodes 101–104 that decode the optical data stream. The coding process and the decoding process can be all-optical processes that are performed by an optical decoder. Such a decoder is characterized by the electric field transfer function that describes how the decoder modifies the input optical data stream according to a specified code. After decoding, the optical signal at each remote node is detected, (i.e., converted into a respective electronic signal). The electronic signal is processed by conditioning and decision circuitry such that the data is recovered only if the code impressed on the optical data at the hub (i.e., the master node 105) matches the code associated with the optical decoder at the receiving node. Otherwise, no data, or data of poor signal fidelity, is received at the decoder.

Suitable code sets for such communication systems can be obtained by, for example, computer-based search methods. The code sets generally have acceptably low crosstalk and permit accurate data recovery at the remote nodes. For example, the presence of an optical signal component corresponding to an encoded with an unmatched code optical signal does not degrade data recovery from an optical signal decoded with a matched code.

Figure 3:
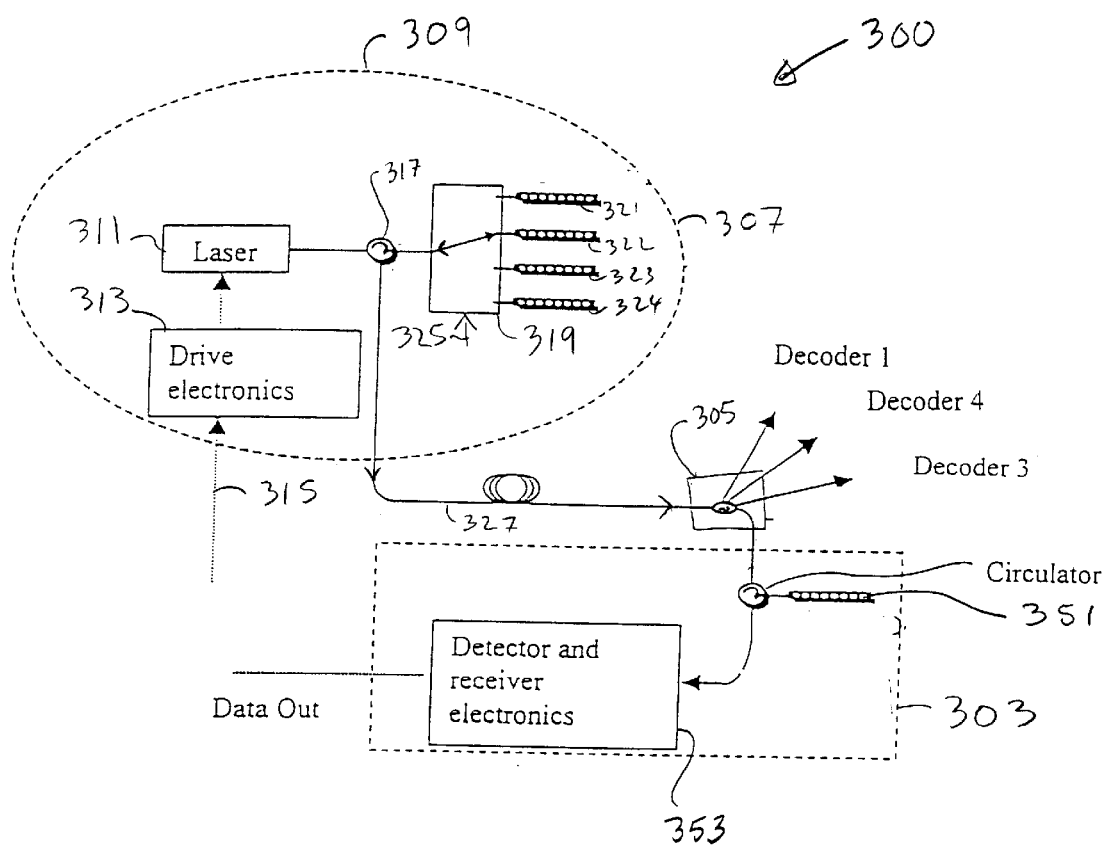
FIG. 3 is a schematic block diagram of a code-switched communication system that includes fiber Bragg grating encoders and decoders.

FIG. 3 is a schematic diagram of a preferred embodiment of a code-switched network 300 that includes fiber Bragg gratings as the encoders and decoders. For purposes of illustration, only a single remote node 303 is illustrated. But, in FIG. 3, an optical splitter 305 is provided for delivering optical signals from a master node 307 (hub) to, for example, four remote nodes. The number of remote nodes can be greater or smaller. At the central master node 307, a transmitter 309 is provided that includes a laser 311, laser drive-electronics 313, and a data input 315. The data input 315 accepts input data ("data in") that is processed by the drive electronics 313 in order to drive or otherwise modulate an optical signal produced by the laser 311. An optical circulator 317 delivers the optical signal to a 1-by-4 optical switch 319 that is configurable to direct the optical signal in a selective manner to one or more encoders 321–324. As shown in FIG. 3, the encoders 321–324 are fiber Bragg gratings (that are reflective in this embodiment). The laser 311 typically emits a sequence of pulses that form an optical data stream having a bandwidth and temporal structure suited to match the selected encoders (and downstream decoders). Alternatively, the optical data stream can be generated with a narrowband laser (replacing the laser 311) combined with an external electro-optic or electro-absorptive modulator (situated between the narrowband laser and the circulator 317) or by any of various other methods.

Encoder selection by the switch 319 is controlled by a channel-selection input 325 that typically is configured to receive an externally applied electrical signal. The switching speed of the switch 319 can range from as fast as a few nsec to a few msec, depending on the switch technology. In an alternative embodiment, the set of fiber Bragg' gratings (fiber encoders 321–324) and the switch 319 can be replaced with a single reconfigurable optical encoder.

The coded optical data stream is received from the selected encoder by the circulator 317 and directed to a fiber 327 or other transmission medium. A multi-way splitter 305 selectively delivers portions of the coded data stream from the fiber 327 to the respective remote nodes. Alternatively, the splitter 305 delivers portions of the coded data stream to one, several, or all of the remote nodes optically connected to the splitter.

As shown in FIG. 3, the remote node 303 includes a decoder 351 implemented as, for example, a fiber Bragg grating, that is matched to a corresponding encoder at the master node 309. After decoding by the decoder 351, the optical signal is detected and processed with a receiver 353 that includes a photodetector and receiver electronics suitable for data recovery. If the optical data stream is encoded with a channel code corresponding to the remote node 303, then the original data provided to the master node 309 is recovered.

Many other embodiments are possible in the code-switched network. Such embodiments generally include optical data streams having optical addresses determined by a code or codes that determine which receiving node can decode the coded optical signal to recover the original data. The encoders and the optical switch shown in FIG. 3 can be combined in a reconfigurable (e.g., electrically tunable) encoder. Similarly, the receiving node can include reconfigurable decoders that permit channel selection at the receiver.

Code-switched communication systems include broadcast transmission systems in which a selected set of remote nodes or all remote nodes of the system can be configured to receive the same optical data stream. In such systems, a data stream is coded with an optical code corresponding to the selected remote nodes (or a code or codes common to all nodes) and the encoded optical signal broadcast to all the selected remote nodes, or to all the remote nodes of the system. Remote nodes associated with codes unmatched to the code used for encoding can receive the coded optical signal but will be unable to recover data from the coded optical signal. Similarly, transmission systems in which a selected set of multiple remote nodes (a subset of all remote nodes that receive different data streams) can be constructed. In such systems, the number of remote nodes in the selected subset can be as few as one or two and as many as the total number of remote nodes.

Although only a forward data-distribution channel (i.e., master node to remote node) is shown in FIG. 3, any of a variety of methods can be used for transmitting in a reverse channel (i.e., remote node to master node). One such method is transmitting uncoded data on the reverse channel. In such a system, contention by the remote nodes can be mitigated in a variety of ways, including enabling reverse-channel transmission only from a node that is actively receiving data from the master hub or master node. Alternatively, a separate control channel can assign time slots for transmission by the remote nodes. Other reverse-channel contention-resolution methods include using optically coded data channels or WDM discriminated data channels.

Code-switched networks, methods, and systems as disclosed herein also can be used with WDM networks to increase transmission capacity of the WDM network. For a WDM network in which WDM channel spacing is greater than the coded signal bandwidth, each WDM channel can carry several coded channels, thereby increasing the addressability (number of optical channels) in the optical network.

While the invention has been described with reference to several examples, it will be appreciated by those skilled in the art that these examples can be modified without departing from the principles of the invention, and the invention is to be limited only by the appended claims.

We claim:

1. An apparatus comprising:
   an optical signal source; and
   a selectable optical encoder coupled to the optical signal source, wherein the selectable encoder includes one or more optical codes with which to encode an optical signal generated by the optical signal source.

2. The apparatus of claim 1 wherein the selectable optical encoder comprises:
   a plurality of optical encoders; and
   an optical switch to switch between individual optical encoders within the plurality of optical encoders.

3. The apparatus of claim 2 wherein the optical switch is driven by a channel selection signal, each channel corresponding to one of the optical encoders.

4. The apparatus of claim 2 wherein the plurality of optical encoders comprises a plurality of fiber Bragg gratings.

5. The apparatus of claim 4 wherein the optical communication medium is an optical fiber.

6. The apparatus of claim 1 further comprising an optical communication medium coupled to an output of the selectable encoder.

7. The apparatus of claim 1 wherein each of the optical codes corresponds to at least one of a plurality of network nodes coupled to the apparatus.

8. A system comprising:
   a network hub comprising:
     an optical signal source, and
     a selectable optical encoder coupled to the optical signal source, wherein the selectable optical encoder includes one or more optical codes with which to encode an optical signal generated by the optical signal source; and
   one or more network nodes coupled to the network hub, wherein each network node includes a decoder capable of using at least one of the optical codes used by the selectable encoder to decode the optical signal.

9. The apparatus of claim 8 wherein the selectable optical encoder comprises:
   a plurality of optical encoders; and
   an optical switch to switch between individual optical encoders within the plurality of optical encoders.

10. The apparatus of claim 9 wherein the plurality of optical encoders comprises a plurality of fiber Bragg gratings.

11. The apparatus of claim 8 wherein the optical switch is driven by a channel selection signal, each channel corresponding to one of the optical encoders.

12. The apparatus of claim 8 wherein each of the optical codes corresponds to at least one of a plurality of network nodes coupled to the apparatus.

13. The system of claim 8 wherein the hub and the one or more network nodes are configured to communicate over a bus.

14. The system of claim 8 wherein the hub and the one or more network nodes are arranged in a ring configuration.

15. The system of claim 8 wherein the hub and the multiple network nodes are arranged in a tree configuration.

16. A process comprising:
   generating an optical signal;
   selecting one or more optical encoders from a plurality of selectable optical encoders, each optical encoder having a corresponding optical code with which it can encode the optical signal; and encoding the optical signal with the one or more of the plurality of selectable optical encoders.

17. The process of claim 16 wherein selecting one or more optical encoders comprises selecting one or more optical encoders based on a channel selection input to an optical switch, each channel corresponding to one of the optical encoders.

18. The process of claim 16 wherein the optical signal encoded with the assigned optical code includes component optical signals encoded with at least two optical codes.

19. The process of claim 16, further comprising transmitting at least a portion of the encoded optical signal.

20. The process of claim 6, further comprising decoding the optical signals at destinations having decoders with optical codes corresponding to the optical codes with which the optical signal is encoded.

21. A process comprising:

generating an optical signal;

selecting one or more optical encoders from a plurality of selectable optical encoders, each optical encoder having a corresponding optical code with which it can encode an optical signal;

encoding the optical signal with the one or more of the plurality of selectable optical encoders;

transmitting the encoded optical signal to one or more network nodes having an optical decoder; and decoding the optical signal at those network nodes whose optical decoders have an optical code corresponding to at least one of the optical codes encoded on the optical signal.

22. The process of claim 21 wherein selecting one or more optical encoders comprises selecting one or more optical encoders based on a channel selection input to an optical switch.

23. The process of claim 21 wherein the optical signal encoded with the assigned optical code includes component optical signals encoded with at least two optical codes.

24. The process of claim 21, further comprising transmitting at least a portion of the encoded optical signal.

* * * * *